United States Patent [19]

Sorensen

[11] Patent Number: 4,744,349

[45] Date of Patent: May 17, 1988

[54] SUPPRESSION OF HEAT CONVECTION IN AQUEOUS INSULATING LAYER OF SOLAR POND

[76] Inventor: Jens O. Sorensen, Box 2278 El Acebo, Rancho Santa Fe, Calif. 92067

[21] Appl. No.: 84,452

[22] Filed: Aug. 11, 1987

Related U.S. Application Data

[63] Continuation-in-part of Ser. No. 889,960, Jul. 28, 1986.

[51] Int. Cl.⁴ .................................................. F24J 3/02
[52] U.S. Cl. ..................................... 126/452; 126/415
[58] Field of Search .................... 126/415, 426, 452; 4/497

[56] References Cited

U.S. PATENT DOCUMENTS

| | | | |
|---|---|---|---|
| 4,085,999 | 4/1978 | Chahroudi | 350/1.1 |
| 4,121,567 | 10/1978 | Carson | 126/415 |
| 4,138,992 | 2/1979 | Shaffer | 126/450 |
| 4,241,724 | 12/1980 | Hull | 126/415 |
| 4,244,351 | 1/1981 | Loeb et al. | 126/415 |
| 4,461,276 | 7/1984 | Yogev et al. | 126/415 |
| 4,470,403 | 9/1984 | Lin | 126/415 |
| 4,480,632 | 11/1984 | Klier et al. | 126/415 |
| 4,537,179 | 8/1985 | Wilkins et al. | 126/415 |
| 4,572,159 | 2/1986 | Södergren et al. | 126/415 |

FOREIGN PATENT DOCUMENTS 236337 11/1961 Australia .

OTHER PUBLICATIONS

Alfonso et al., "On The Application of Layers of Immiscible Liquids to the Insulation Zone of a Solar Pond".

Primary Examiner—Samuel Scott
Assistant Examiner—Allen J. Flanigan
Attorney, Agent, or Firm—Edward W. Callan

[57] ABSTRACT

A solar pond, including a heat absorbing fluid and an insulating layer disposed above and covering the heat absorbing fluid; wherein the insulating layer includes a body of water and fibers suspended in and dispersed throughout the body of water. The fibers have an density that is approximately the same as the density of the body of water and an index of refraction that is approximately the same as the index of refraction of the body of water. The viscosity of the insulating layer may be increased by adding a thickening agent and/or a gel thereto to thereby further suppress heat convection in the insulating layer. The insulating layer further includes membranes defining baffles or closed cells in the body of water to further suppress heat convection in the insulating layer.

18 Claims, 1 Drawing Sheet

SUPPRESSION OF HEAT CONVECTION IN AQUEOUS INSULATING LAYER OF SOLAR POND

CROSS-REFERENCE TO RELATED APPLICATION

This is a continuation-in-part of U.S. patent application No. 889,960 filed July 28, 1986.

BACKGROUND OF THE INVENTION

The present invention generally pertains to solar ponds and is particularly directed to insulating layers for deep solar ponds.

Deep solar ponds are characterized by a bottom layer of a heat absorbing fluid covered by an insulating layer that is transparent to solar radiation. The pond typically has a dark bottom, which is heated by solar radiation, whereby the bottom layer of heat absorbing fluid is heated by convection of heat from the bottom. The insulating layer retards loss of heat from the bottom layer of heat absorbing fluid into the atmosphere.

In one prior art solar pond, the insulating layer is formed of a viscous gel floating on top of the heat absorbing fluid of the bottom layer in order to inhibit convection near the upper surface of the pond. This technique is described in U.S. Pat. No. 4,537,179 to Wilkins et al.

SUMMARY OF THE INVENTION

The present invention provides a system and method for suppressing heat convection in a insulating layer of a solar pond. In accordance with the present invention, the insulating layer includes water and fibers suspended in and dispersed throughout the water. The insulating layer may be mostly water, thereby providing an insulating layer that is relatively inexpensive. Preferably, the fibers have a density approximately the same as the density of water so as to remain suspended in and dispersed throughout the water. It also is preferable that the fibers have an index of refraction which is approximately the same as the index of refraction of water so as to be relatively transparent to solar radiation.

Additional features of the present invention are described in relation to the description of the preferred embodiments.

DESCRIPTION OF THE PREFERRED EMBODIMENTS

Figure 1:
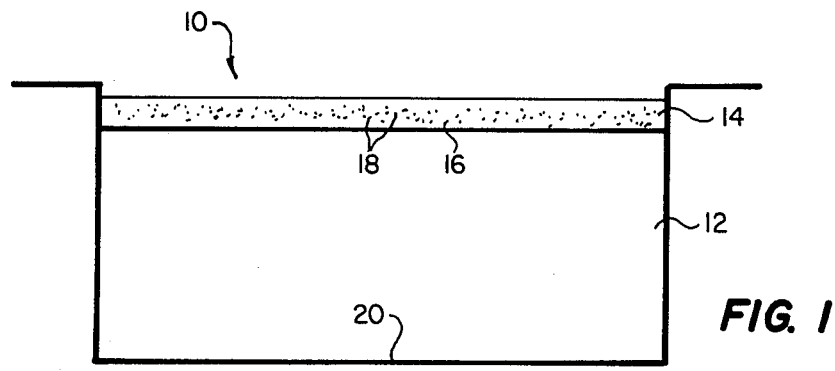
FIG. 1 is a schematic representation of a preferred embodiment of a solar pond according to the present invention.

Referring to FIG. 1, a solar pond 10 according to the present invention includes a heat absorbing layer 12 and an insulating layer 14. The insulating layer 14 includes water 16 and fibers 18 suspended in and dispersed throughout the water 16. Solar radiation passes through the insulating layer 14 and heats the bottom 20 of the pond. Heat convects throughout the heat absorbing fluid 12 from the bottom 20 of the pond.

The heat absorbing layer 12 and the insulating layer 14 are two distinct and separate fluids. In the preferred embodiment the density of the insulating layer 14 is less than the density of the heat absorbing layer 12, whereby the insulating layer 14 resides above the heat absorbing layer 12. The heat absorbing layer 12 and the insulating layer 14 may be salt solutions of different densities. In state-of-the-art solar ponds the insulating and heat absorbing layers of different densities respectively include salt solutions of different densities. If the pond is kept relatively quiet from wave motion, the blending of the insulating layer with the heat absorbing layer is very gradual and may take several years, whereby ponds of such nature are economically viable.

In one alternative preferred embodiment, the heat absorbing layer 12 and the insulating layer 14 are immiscible fluids.

In another alternative preferred embodiment, the heat absorbing layer and the insulating layer are separated by a membrane.

The density of the fibers is approximately the same as the density of water so as to maintain the suspension and dispersal of the fibers throughout the water. If the density of the fiber material should be greater than the density of pure water, the density of the water can be increased by dissolving salt therin in appropriate proportions.

The index of refraction of the fibers is approximately the same as the index of refraction of water so that the fibers are transparent to solar radiation. A preferred fiber material is polytetra-fluorethene (popularly known as Teflon), which has an index of refraction of 1.343. The index of refraction of water is 1.333. The fibers may be selected from a group of materials consisting of plastics, glass and minerals.

The concentration of the fibers in the body of water is relatively small, being in the range of 0.1 to 0.5 percent. Accordingly, an insulating layer that is mostly water is relatively inexpensive.

The insulating layer 14 may further include a thickening agent and/or a gel, dispersed in the body of water to increase the viscosity of the insulating layer 14 to thereby further suppress heat convection in the insulating layer 14. A suitable thickening agent is described in U.S. Pat. No. 4,138,992 to Shaffer. A suitable gel is described in U.S. Pat. No. 4,537,179 to Wilkins et al. In such an embodiment, the index of refraction of the fibers is approximately the same as that of the aqueous fluid including the water and the thickening agent and/or the gel.

Figure 2:
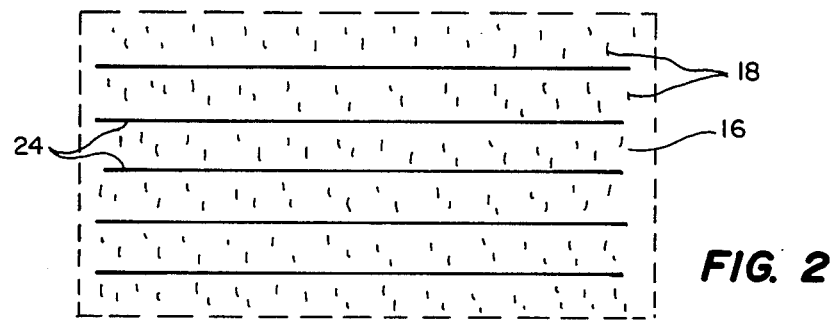
FIG. 2 illustrates a preferred embodiment of an insulating layer according to the present invention.
Figure 3:
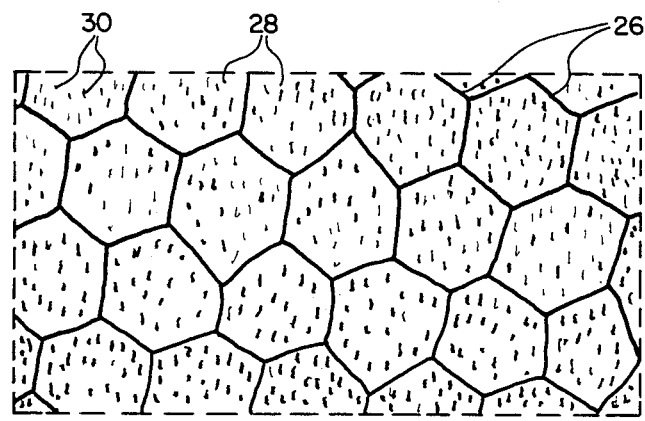
FIG. 3 illustrates an alternative preferred embodiment of an insulating layer according to the present invention.

To further suppress convection, the insulating layer may also include transparent plastic membranes. The membranes may define baffles 24, as shown in FIG. 2, or closed cells 26, as shown in FIG. 3. Each closed cell 26 includes a body of water 28 and fibers 30 suspended in and dispersed throughout the body of water 28. Each closed cell may further include a thickening agent to increase viscosity within the cell 26 and thereby further suppress heat convection within the cell.

The insulating layer may be formed by mixing the fibers with the water to suspend and disperse the fibers in the water. A thickening agent likewise may be mixed with the water to form an aqueous fluid having an increased viscosity. The water having the fibers suspended and dispersed therein (and also the thickening agent when so preferred) may be placed in closed cells, and the closed cells are disposed to completely cover the heat absorbing fluid 12 in the solar pond 10 and thereby form the insulating layer 14.

I claim:

1. A method of suppressing heat convection in an insulating layer of a solar pond containing a heat absorbing fluid, comprising forming the insulating layer by the steps of
   (a) providing a body of water above the heat absorbing fluid; and
   (b) suspending fibers in and dispersing the fibers throughout the body of water.

2. A method according to claim 1, further comprising the step of
   (c) dispersing a thickening agent and/or a gel throughout the body of water to increase the viscosity of the insulating layer and thereby further suppress heat convection in the insulating layer.

3. A method according to claim 2, further comprising the step of
   (d) disposing membranes in the body of water to further suppress heat convection throughout the insulating layer.

4. A method according to claim 1, further comprising the step of
   (c) disposing membranes in the body of water to further suppress heat convection throughout the insulating layer.

5. A method according to claim 1, wherein step (b) comprises the step of
   (c) suspending and dispersing said fibers that have a density approximately the same as the density of water.

6. A method according to claim 5, wherein step (b) comprises the step of
   (d) suspending and dispersing said fibers that are transparent to solar radiation.

7. A method according to claim 1, wherein step (b) comprises the step of
   (c) suspending and dispersing said fibers that are transparent to solar radiation.

8. A method according to claim 7, wherein step (b) comprises the step of
   (d) suspending and dispersing said fibers that have an index of refraction approximately the same as the index of refraction of water.

9. A solar pond comprising
   a heat absorbing fluid; and
   an insulating layer disposed above the heat absorbing fluid, the insulating layer comprising
   a body of water; and
   fibers suspended in and dispersed throughout the body of water for suppressing heat convection in the body of water.

10. A pond according to claim 9, further comprising a thickening agent and/or a gel dispersed throughout the body of water for increasing viscosity within the water to thereby suppress heat convection in the insulating layer.

11. A pond according to claim 10, further comprising membranes in the body of water for suppressing heat convection in the insulating layer.

12. A pond according to claim 9, further comprising membranes in the body of water for suppressing heat convection in the insulating layer.

13. A pond according to claim 12, wherein the membranes define cells within the insulating layer, wherein each cell includes a body of water having said fibers suspended and dispersed therein.

14. A pond according to claim 9, wherein the fibers have a density that is approximately the same as the density of water.

15. A pond according to claim 14, wherein the fibers have an index of refraction that is approximately the same as the index of refraction of water.

16. A pond according to claim 9, further comprising
   a thickening agent and/or a gel dispersed throughout the body of water for increasing the viscosity of the insulating layer to thereby suppress heat convection in the insulating layer:
   wherein the fibers have an index of refraction that is approximately the same as the index of refraction of the combination of the water and the thickening agent and/or the gel.

17. A pond according to claim 9, wherein the fibers are transparent to solar radiation.

18. A pond according to claim 17, wherein the fibers are made of materials selected from a group consisting of plastics, glass and minerals.

* * * * *